(12) United States Patent
Dillingham

(10) Patent No.: US 11,299,873 B1
(45) Date of Patent: Apr. 12, 2022

(54) SEWAGE BACKFLOW PREVENTING VALVE

(71) Applicant: Benjamin Dillingham, Petaluma, CA (US)

(72) Inventor: Benjamin Dillingham, Petaluma, CA (US)

( * ) Notice: Subject to any disclaimer, the term of this patent is extended or adjusted under 35 U.S.C. 154(b) by 0 days.

(21) Appl. No.: 17/100,230

(22) Filed: Nov. 20, 2020

Related U.S. Application Data

(60) Provisional application No. 62/939,537, filed on Nov. 22, 2019.

(51) Int. Cl.
*E03B 7/07* (2006.01)
*F16K 31/30* (2006.01)
*E03F 7/04* (2006.01)

(52) U.S. Cl.
CPC .............. *E03B 7/077* (2013.01); *F16K 31/30* (2013.01); *E03F 7/04* (2013.01); *Y10T 137/402* (2015.04)

(58) Field of Classification Search
CPC .... F16K 31/30; F16K 31/18–34; F16K 33/00; F16K 15/04; F16K 15/1843; F16K 15/1823; F16K 21/08; F16K 31/062; F16K 31/0631; F16K 31/0637; F16K 27/0245; F16K 17/285; F16K 17/30; F16K 17/366; F16K 11/056; F16K 1/14; E03B 7/077; F16T 1/20–32; F16T 1/383; F16T 1/386; F16T 1/40; F16T 1/45; Y10T 137/791; Y10T 137/402; E03F 7/06; E03F 7/04; E03F 7/00; E03F 7/02; E03F 5/042; E03F 5/12; E03F 5/125

USPC ..... 137/356–373, 15.26, 165, 192–196, 197, 137/199, 202, 533, 533.11, 533.19, 409, 137/410, 429, 433, 449, 526, 512, 101.27; 4/211, 219–221; 52/302.1–302.7
See application file for complete search history.

(56) References Cited

U.S. PATENT DOCUMENTS

| | | | | |
|---|---|---|---|---|
| 56,478 | A * | 7/1866 | Williams | E03C 1/288 137/247.21 |
| 174,874 | A * | 3/1876 | Thorp | E03C 1/288 137/247.21 |
| 179,881 | A * | 7/1876 | Underwood | E03C 1/288 137/247.21 |
| 844,003 | A * | 2/1907 | Conrad | E03F 5/042 210/119 |
| 847,112 | A * | 3/1907 | Renton | B63B 13/00 114/197 |
| 975,153 | A * | 11/1910 | O'Neill et al. | F16K 31/26 137/449 |

(Continued)

*Primary Examiner* — Craig J Price
(74) *Attorney, Agent, or Firm* — Thomas M. Freiburger

(57) ABSTRACT

A sewage backflow prevention device is installed in a gravity flow waste pipe, particularly for a residence or residences. The device includes a cylindrical body with a closed top, outflow holes in the sides, and an open bottom to be secured to the upper end of a Tee in the gravity flow sewage pipe, between the residence and the sewer. Within the cylindrical body is a hollow, floatable disk or float ball that normally closes the bottom of the backflow device preventing escape of gases. When a downstream blockage occurs, liquid rises into the device, floats the closure disk or ball upward and flows outwardly through the openings. At valve closure position the valve closure disc or ball is mostly below the outflow holes such that rats or other rodents cannot push under and lift the ball or disc.

6 Claims, 2 Drawing Sheets

(56) References Cited

U.S. PATENT DOCUMENTS

| | | | | |
|---|---|---|---|---|
| 1,189,814 A * | 7/1916 | Hayes | F04B 39/1033 | 137/454.4 |
| 1,430,986 A * | 10/1922 | Hallman | F04B 53/1002 | 137/515.5 |
| 1,515,904 A * | 11/1924 | Sievers | E02B 11/005 | 137/101.27 |
| 1,519,832 A * | 12/1924 | Griffin | F16K 31/22 | 137/426 |
| 1,637,076 A * | 7/1927 | Heil | F16K 17/194 | 137/43 |
| 1,643,818 A * | 9/1927 | Manning | F16K 15/04 | 137/390 |
| 1,672,394 A * | 6/1928 | Sargent | F16K 15/04 | 137/533.13 |
| 1,730,452 A * | 10/1929 | Davis | F04B 53/10 | 137/454.5 |
| 1,897,492 A * | 2/1933 | Ledoux | G05D 11/006 | 137/433 |
| 2,116,422 A * | 5/1938 | Anderson | E03F 7/04 | 137/101.27 |
| 2,278,715 A * | 4/1942 | Stoyke | F16K 15/04 | 137/533.13 |
| 2,775,979 A * | 1/1957 | Stout et al. | F16K 15/00 | 137/107 |
| 2,919,670 A * | 1/1960 | Clark, Jr. | F16K 1/14 | 114/185 |
| 3,116,751 A * | 1/1964 | Hamilton | E03F 5/042 | 137/362 |
| 3,491,790 A * | 1/1970 | Sanford | F16K 15/04 | 137/533.11 |
| 3,525,358 A * | 8/1970 | Ludwig | F16K 17/0406 | 137/529 |
| 3,547,355 A * | 12/1970 | Salazar | A01G 25/023 | 239/547 |
| 3,603,340 A * | 9/1971 | Rousselet | E03F 5/12 | 137/357 |
| 3,610,275 A * | 10/1971 | Determan | F16K 31/22 | 137/430 |
| 3,805,826 A * | 4/1974 | Westerhoff | E03F 3/02 | 137/516.11 |
| 3,958,591 A * | 5/1976 | Hansel | F16K 21/18 | 137/202 |
| 4,007,710 A * | 2/1977 | Johnson | A01J 9/06 | 119/14.03 |
| 4,014,361 A * | 3/1977 | Rodieck | A01G 25/162 | 137/122 |
| 4,051,030 A * | 9/1977 | Huiet, Jr. | B01D 17/0214 | 210/114 |
| 4,245,664 A * | 1/1981 | Johnson | F17D 1/08 | 137/236.1 |
| 4,261,386 A * | 4/1981 | Young | E03F 5/12 | 101/169 |
| 4,314,583 A * | 2/1982 | Peterson | F16K 15/04 | 137/533.11 |
| 4,413,615 A * | 11/1983 | Sigworth, Jr. | F24S 90/10 | 126/584 |
| 4,624,176 A * | 11/1986 | Steinke | F24F 13/10 | 454/359 |
| 4,627,460 A * | 12/1986 | Eising | F16T 1/22 | 137/192 |
| 4,637,426 A * | 1/1987 | Lyon | F16K 15/04 | 137/433 |
| 5,095,940 A * | 3/1992 | Saur | F01P 11/028 | 137/533.11 |
| D376,844 S * | 12/1996 | Hester | D23/387 | |
| 5,662,138 A * | 9/1997 | Wang | E03F 5/042 | 137/315.08 |
| 5,709,242 A * | 1/1998 | Bergen | F16K 15/04 | 137/533.11 |
| 5,797,426 A * | 8/1998 | Powell | F16K 15/04 | 137/433 |
| 6,234,198 B1 * | 5/2001 | Chalich | F16K 24/06 | 137/526 |
| 6,295,661 B1 * | 10/2001 | Bromley | E04H 4/1236 | 137/362 |
| 6,318,397 B1 * | 11/2001 | Huber | E03F 5/0407 | 137/15.19 |
| 6,357,376 B1 * | 3/2002 | Purio | F16K 31/22 | 114/197 |
| 6,848,465 B1 * | 2/2005 | Ledbetter | F16K 24/044 | 137/202 |
| 6,931,882 B1 * | 8/2005 | Yang | F16T 1/22 | 62/285 |
| 7,033,108 B1 * | 4/2006 | Hummert | E01C 13/083 | 137/236.1 |
| 7,140,388 B2 * | 11/2006 | Chalich | F16K 15/042 | 137/526 |
| 7,370,665 B2 * | 5/2008 | Smith | A01M 7/0085 | 137/399 |
| 7,854,238 B2 * | 12/2010 | Zatarain | F25D 21/14 | 137/247.21 |
| 7,857,546 B2 * | 12/2010 | Furrer | E02B 13/02 | 405/37 |
| 10,451,307 B2 * | 10/2019 | Stammer | F16T 1/22 | |
| 10,472,816 B2 * | 11/2019 | Griebel | E03F 5/0407 | |
| 2003/0024571 A1 * | 2/2003 | Simmons | F16K 15/04 | 137/329.05 |
| 2006/0283505 A1 * | 12/2006 | Makowan | F16K 24/046 | 137/388 |
| 2009/0050546 A1 * | 2/2009 | Nishimoto | E03C 1/288 | 210/126 |
| 2011/0067765 A1 * | 3/2011 | Army, Jr. | F16K 24/046 | 137/410 |
| 2013/0087220 A1 * | 4/2013 | Schlekewy | F16K 31/28 | 137/409 |
| 2013/0118608 A1 * | 5/2013 | Holiday | F16T 1/26 | 137/409 |
| 2014/0026987 A1 * | 1/2014 | Ayers | E21B 34/02 | 137/533.11 |

* cited by examiner

SEWAGE BACKFLOW PREVENTING VALVE

This application claims benefit of provisional application Ser. No. 62/939,537, filed Nov. 22, 2019.

BACKGROUND OF THE INVENTION

The invention concerns sewerage components, and in particular a backflow prevention valve that provides for overflow of sewage from a lateral gravity sewage pipe in the event of downstream blockage of the pipe.

Sewage backflow prevention valves are known, in several different configurations. In one typical design the device has an exterior in the shape of an inverted cone with rounded top, a flared dome shape. The valve closure comprises a ball that normally rests on a circular valve seat opening above a Tee fitting in the sewer line, so that the seated ball prevents escape of sewer gases. A blockage in the sewer pipe below the valve will cause flow of sewer water up into the device, lifting the ball off the seat so that sewage pours out the open bottom side of the inverted cone, and backup of sewage into the upstream residence is prevented. However, in this common device rats can gain access to the sewage system by simply pushing the ball upwardly and entering the pipe. Other disadvantages relate to cost and reliability.

SUMMARY OF THE INVENTION

The invention is an improved sewage backflow prevention device for installation in a gravity flow waste pipe, particularly for a residence or residences but also for commercial buildings. The device includes a preferably cylindrical body with a closed top, outflow holes in the sides, and an open bottom to be secured to the upper end of a Tee in the gravity flow sewage pipe, between the residence and the sewer. Within the cylindrical body is a hollow, floatable valve closure member that normally closes the bottom of the backflow device preventing escape of gases. When a downstream blockage occurs, liquid rises into the device, floats the valve closure member upward and flows outwardly through the openings. The valve closure member can be in the form of a flat-surfaced disc or plate, or a hollow ball, i.e. essentially spherical, or other suitable shapes.

By the construction and function of the backflow prevention device, rats or other vermin are unable to enter the sewer through the device, since they cannot lift the disk or ball by access via the outflow holes. In addition, the device is simple and efficient in construction and reliable in service. Other advantages and features of the invention will be apparent from the embodiments of the invention described below.

DESCRIPTION OF PREFERRED EMBODIMENTS

Figure 1:
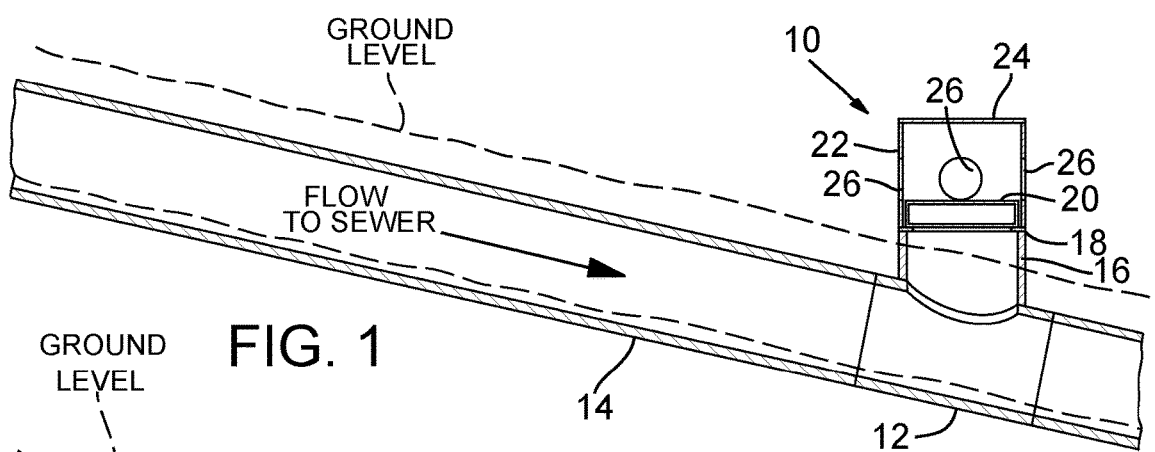
FIG. 1 is a side view showing a sewer line from one or more residences, with gravity flow toward a sewer.
Figure 1A:
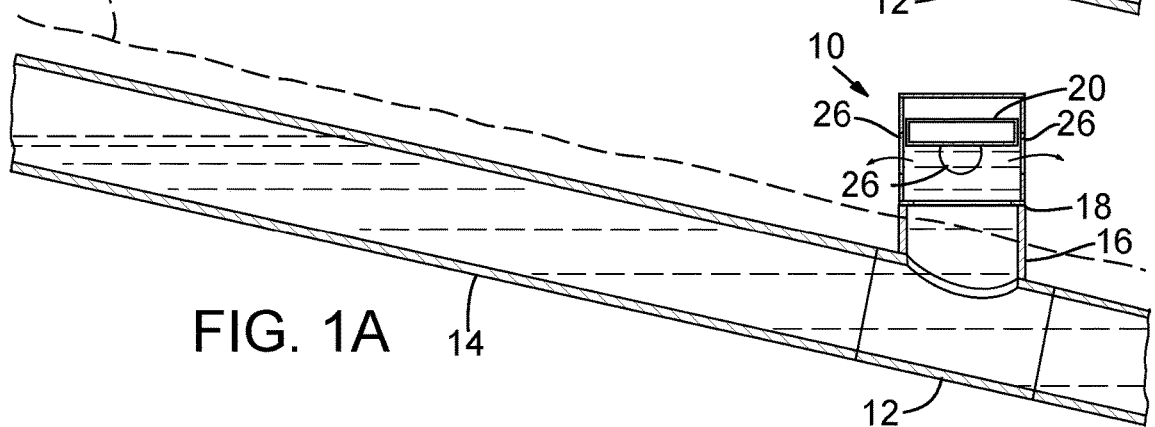
FIG. 1A is a similar view showing the sewer line in a blockage/overflow condition.

FIG. 1 schematically shows the device 10 of the invention fitted onto a Tee 12 in a residential or other gravity flow sewer pipe 14. The flow of sewage is downward to the right in the drawing, from a household or other plumbing system toward a sewer or sewer line. Occasionally the sewer pipe 14 will "back up", i.e. a blockage will occur downstream of the device 10, very often from tree roots invading the pipe via cracks. When this occurs, as indicated in FIG. 1A, sewage can be partially or totally blocked from reaching the sewer, and will back up in the line 14. Without some form of backflow preventer valve, the backup would eventually reach the plumbing of the residence or other building.

The device 10 provides a relief valve for sewage so that this does not happen. The "Tee" 12 in the pipe 14 has an upward leg 16 at an appropriate angle so as to be substantially vertical. The backflow preventer valve device 10 of the invention is fitted onto the open upper end of the Tee's arm 16. The device has a bottom lip 18, best seen in FIG. 2, that extends inwardly of the internal cylindrical wall. Preferably the device is attached to the top of the Tee by mechanical means, such as an ARC band, although other attachment means can be used. As FIG. 1A shows, the rising sewage floats a float disk 20 up to expose outflow holes.

Figure 2:
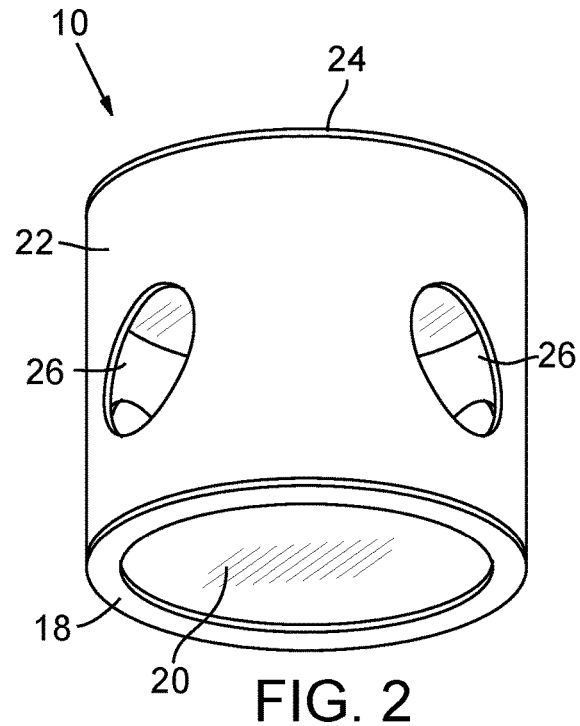
FIG. 2 is a perspective view of a backflow preventer valve of the invention.

As shown in FIG. 2, the circular float disk 20 resides within the cylindrical body 22 of the device. The body may be formed of aluminum tubing, another metal, or an appropriate plastic such as HDPE. The top end 24 of the device's body is closed by a top 24. Several sewage outflow holes 26 are provided in the cylindrical wall of the body 22.

Figure 3:
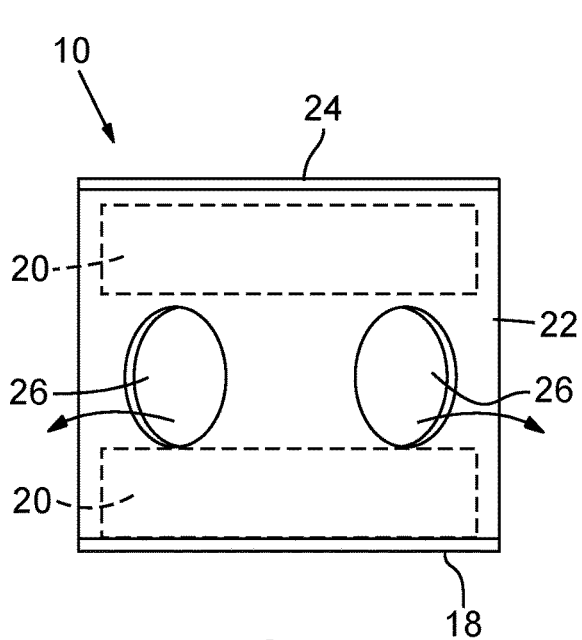
FIG. 3 is a side view of the valve of the invention.

The float disk 20 can be of any appropriate material, e.g. a hollow body formed of HDPE, which will not be attacked by sewage. The exterior of the disk is slightly smaller in diameter than the interior diameter of the body 22, so that the disk can move freely up and down within the body. It may be about one inch in height, although its height is not critical. The disk 20 rests on the lip 18 of the body, acting as a valve seat and extending inwardly from the ID of the body 22 by a distance sufficient to support the disk 20, such as about ¼ inch or ⅜ inch. When the disk rests against the inside of the lip by gravity, this essentially seals off the device 10 from sewer gases within the pipeline 14. In this position the disc may be just below the bottom point of the hole or holes 26, as shown in FIGS. 1 and 3, or a portion of it may be exposed, i.e. no more than one half its height, or one third. By this configuration a rat or rodent will be unable to apply side force that will lift the disc to permit access into the sewer line.

FIG. 3 is a schematic view showing the device 10 and different positions of the float disk 20, illustrated in dashed lines. The lower position is the normal position, with the disk 20 resting against the lip 18 of the body 22 by gravity. Sewer gas is prevented from reaching and exiting the holes 26. However, when a blockage occurs, backing up liquid to the extent that it reaches the device 10, the float 20 rises, essentially to the upper position shown in FIG. 3, and sewage flows out through the holes 26, preventing a backup at toilets and other plumbing of the residence.

Figure 4:
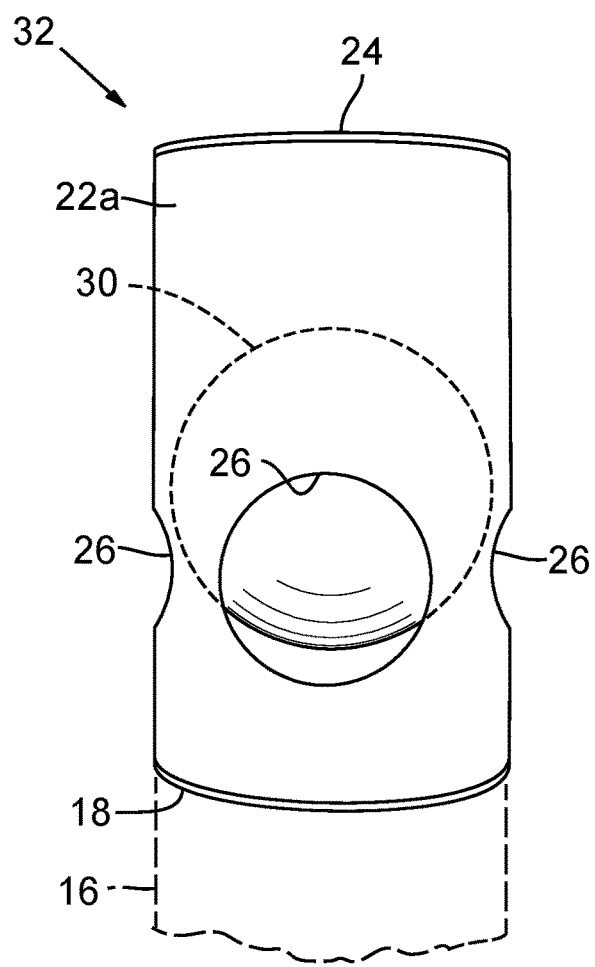
FIGS. 4 and 5 are perspective views showing a second embodiment of the backflow preventer valve.
Figure 5:
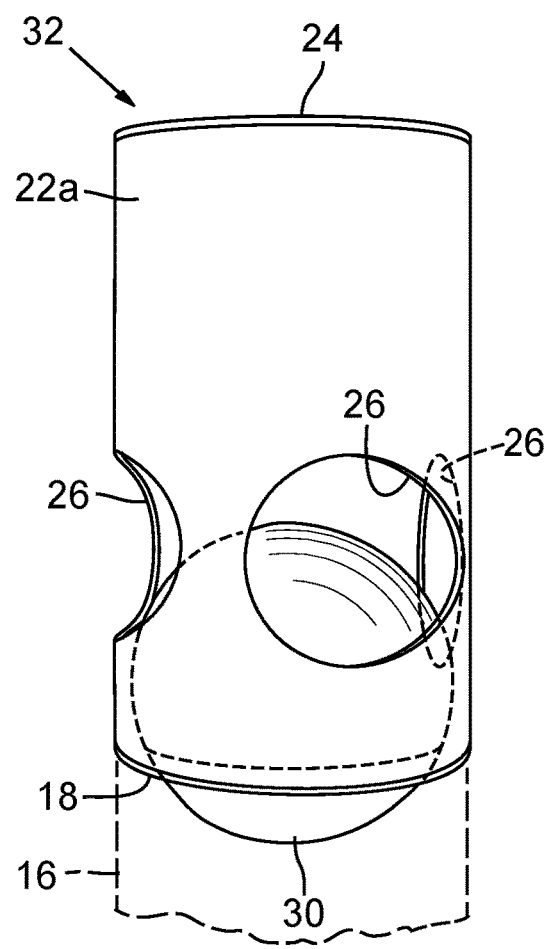

FIGS. 4 and 5 show a variation of the invention. The principle is the same, but the valve closure member is a float ball 30 rather than the flat-sided float disk 20 of the first embodiment. The sewage backflow preventing device 32 in this form has a somewhat taller housing or body 22a, but the body is otherwise the same as in the first embodiment. It is shown in upright vertical orientation as it would be installed (as in FIGS. 1 and 1A). The lower end has an inwardly extending lip or rim 18 forming a valve seat as in FIG. 2, although not visible in these drawings. FIG. 4 shows the float ball 30 in an elevated position, as if it has been floated upwardly by an overflow event, allowing sewage to pour out through the side outflow holes 26. FIG. 5, however, shows the float ball valve closure member 30 in its normal position, resting by gravity and sealing against the rim or lip 18 within the body 22a. At this point the device 32 is installed in a sewer lateral in the same manner as shown in FIGS. 1 and 1A.

As can be seen in FIG. 5, the float ball is at a sufficiently low point in the body 22a that a rat, rodent or other small animal will not be able to lift the ball 30 by access through the outflow hole or holes. Any force against the portion of the float ball 30 that is extending to the level of the holes 26 would simply push the ball down more firmly against the valve seat 18. When seated on the valve seat 18 as in FIG. 5, the center of the ball 30 is no higher than the bottom (lowest point) of the hole 26, that is, no more than half the height of the ball is exposed at the hole. Preferably the center point is below the bottom of the hole, and most preferably no more than one third of the ball is exposed, i.e. above the lowest point of the hole.

As with the disc described above, the valve closure ball 30 can be formed of any material resistant to corrosion or attack by sewage, such as HDPE. The diameter of the ball 30 is such as to allow the ball to move freely up and down in the body.

Many variations are possible for the backflow preventer device 10. The circular shape is not necessary; the shape could be hexagonal, octagonal, square, etc., with the closure member shaped appropriately, except that the shape is intended to allow mating with the upper end of a sewer pipe Tee preferably without any adapter. The body 22/22a of the device could be molded, such as by injection molding of an appropriate plastic material such as HDPE. Thus, the top 24 or the lip 18 could be formed integrally with the body 22/22a, rather than being secured together. Either the lip 18 or the top 24 must be assembled to the cylindrical body in order to allow the float disk 20 or ball 30 to be inserted into the interior. The rim/lip 18 could be secured in any practical manner, such as by screw threads, adhesive, heat fusion or other means. If the body 22/22a is formed of metal, the top 24 and the lip 18 can be secured by welding, adhesion, screw threads or other means. The sewage outflow holes 26 can be fewer or greater than four, and their size is determined only by the expected volumetric flow rate in a backflow event.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A sewer lateral line as part of a gravity flow sewage system from a residential or commercial building, including a sewage backflow preventing relief valve, comprising:
the backflow preventing relief valve having a hollow body with a closed upper end and an open lower end connected to a top opening of an upwardly extending leg of a Tee in the sewer lateral line of the gravity flow sewage system,
at least one sewage outflow hole, open to atmosphere, in a side of the body,
a valve seat in the body below the at least one sewage outflow hole,
a valve closure member within the body, adjacent to the at least one sewage outflow hole, the valve closure member comprising a float movable upwardly and downwardly in the body, to be buoyed and forced upwardly in the event of liquid moving upwardly from the open lower end of the body into the body, and the valve closure member being configured to form a substantially sealing closure against the valve seat in normal configuration with the valve closure member resting by gravity on the valve seat, when liquid has not moved upwardly into the body, and
the valve closure member being in a height relationship with the at least one sewage outflow hole such that when the valve is resting on the valve seat, the valve closure member cannot be forced upwardly by a pushing force against the valve closure member exerted from the at least one sewage outflow hole, as by a rat or other rodent,
whereby if a blockage occurs in the sewer lateral line downstream of the Tee, sewage will accumulate in the lateral line and enter the Tee, raising the valve closure member and overflowing out through the at least one sewage outflow hole, preventing backup in the sewer lateral line and into the residential or commercial building.

2. The sewer lateral line as part of a gravity flow sewer system as in claim 1, wherein the closure member comprises a hollow disc configured to rest flatly against the valve seat in normal configuration, with less than half the height of the disc being exposed at the at least one outflow hole.

3. The sewer lateral line as part of a gravity flow sewer system as in claim 2, wherein no more than one third of the height of the disc is exposed at the at least one outflow hole in normal configuration.

4. The sewer lateral line as part of a gravity flow sewer system as in claim 1, wherein the valve closure member comprises essentially a hollow valve closure ball within the body, the body being essentially cylindrical and the valve seat being essentially circular, such that the valve closure ball when in a lowered position of valve closure rests against the valve seat with a portion of the valve closure ball extending down below the valve seat.

5. The sewer lateral line as part of a gravity flow sewer system as in claim 4, wherein said height relationship is such that the valve closure ball, when in the lowered, normal configuration of valve closure, is positioned such that an upper part of the valve closure ball comprising no more than half the height of the valve closure ball is exposed at the at least one outflow hole.

6. The sewer lateral line as part of a gravity flow sewer system as in claim 5, wherein no more than one third of the height of the valve closure ball, when in normal configuration of valve closure, is exposed at the at least one outflow hole.

* * * * *